US010395373B1

United States Patent
Brewster et al.

(10) Patent No.: US 10,395,373 B1
(45) Date of Patent: Aug. 27, 2019

(54) IMAGE FEATURE DETECTION (71) Applicant: Pinterest, Inc., San Francisco, CA (US)

(72) Inventors: Kent Stanley Brewster, East Palo Alto, CA (US); Annie Ji Won, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 29 days.

(21) Appl. No.: 15/719,448

(22) Filed: Sep. 28, 2017

Related U.S. Application Data (60) Provisional application No. 62/481,019, filed on Apr. 3, 2017.

(51) Int. Cl.
*G06K 9/00* (2006.01)
*G06T 7/11* (2017.01)
*G06T 7/90* (2017.01)

(52) U.S. Cl.
CPC .............. *G06T 7/11* (2017.01); *G06T 7/90* (2017.01); *G06T 2210/12* (2013.01)

(58) Field of Classification Search
CPC ..... G06T 7/11; G06T 7/33; G06T 7/73; G06T 7/246; G06T 2210/12; G06K 9/3233; G06K 2009/3233; G06K 2009/00268; G06K 2009/00523; G06K 2009/00617; G06K 2009/00758; H04N 19/543; H04N 19/587; H04N 19/59
See application file for complete search history.

(56) References Cited

U.S. PATENT DOCUMENTS

| | | | | |
|---|---|---|---|---|
| 8,160,302 B2* | 4/2012 | Wagg | ................... | G06T 7/254 382/107 |
| 8,233,721 B2* | 7/2012 | Wagg | ................. | G06K 9/00348 382/103 |
| 2008/0134094 A1* | 6/2008 | Samadani | ............. | G06T 3/0012 715/838 |
| 2012/0243796 A1* | 9/2012 | Saito | ....................... | G06T 5/006 382/218 |
| 2014/0050367 A1* | 2/2014 | Chen | ................... | H04N 5/23212 382/112 |
| 2014/0201126 A1* | 7/2014 | Zadeh | .................... | G06K 9/627 706/52 |

OTHER PUBLICATIONS

Automatic detection of Red-Eye artifacts—Photos, A. Mufit Ferman, IEEE, 978-1-4244-1764-3, 2008, pp. 617-620 (Year: 2008).*

* cited by examiner

*Primary Examiner* — Jayesh A Patel
(74) *Attorney, Agent, or Firm* — Athorus, PLLC (57) ABSTRACT

Systems and methods for identifying an interesting feature in displayed content are presented. In response to a user's direction to identify an interesting feature of content displayed on the user's computing device, an image capture operation is conducted. The image capture operation captures some of the content displayed on the computing device and rendered to a working image. One or more processing passes are conducted on the working image to reduce various aspects of the working image. Remaining features in the working image, after the one or more processing passes, are identified and at least one feature is identified as a selected feature. A bounding box of the selected feature is mapped to the captured image, and a sub-image of the captured image as determined by the mapped bounding box is used as an interesting feature of the captured image.

20 Claims, 9 Drawing Sheets

Results of working image processed to convert top N colors to designated background color and converting to HSL

IMAGE FEATURE DETECTION

CROSS-REFERENCE TO RELATED ITEMS

This application claims priority to U.S. Provisional Patent Application No. 62/481,019, filed Apr. 3, 2017, the entirety of which is incorporated by reference.

BACKGROUND

Often a computer user will want to see images related to some interesting item or feature among the content that the user sees displayed on a computer. Perhaps the user's desire is to find related images of an unusual animal shown to the user, or a car featured in a movie that the computer user is watching. Perhaps, with enough effort and assorted software tools, the computer user can ultimately manually capture an image of the desired feature and, using the captured image, make a request to an online service to locate related images. Unfortunately, this process is cumbersome at best. On the other hand, simply submitting content of the entire displayed content so that some online service can identify interesting features within the content raises serious privacy concerns.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

According to aspects of the disclosed subject matter, in response to a computer user's direction to identify interesting features among content displayed on the user's computing device, an image capture operation is conducted. This image capture operation obtains a captured image of all or some of the content that is displayed on the user's computing device. A working image is generated from the captured image and one or more processing passes are conducted on the working image to reduce and/or isolate various aspects or features of the working image. Remaining artifacts in the working image, after conducting the one or more processing passes, are identified and at least one artifact is identified as a selected feature of the image. A bounding box of the selected artifact is mapped to the captured image, and a corresponding sub-image of the captured image, as determined by the mapped bounding box, is used as an interesting feature of the captured image.

According to aspects of the disclosed subject matter, the one or more processing passes includes reducing the pixel resolution (also referred to as the image resolution) of the working image. Advantageously, reducing the pixel resolution reduces the amount of image data that must be analyzed and/or processed in identifying one or more interesting features, all without significantly affecting the ability to identify one or more interesting features of the captured image. Further, this reduction in pixel resolution enables computing devices of lesser processing abilities to carry out the function of identifying one or more interesting features within the content displayed to the computer user on the computing device.

In yet another aspect of the disclosed subject matter, the one or more processing passes includes a phase of reducing the color resolution of the working image. In this processing pass, similar colors are merged as a single color. In regard to similar colors and according to various embodiments of the disclosed subject matter, two colors whose variation (in terms of the various values to represent the color) from one another falls within some threshold amount are viewed as the same color. For example, and by way of illustration and not limitation, if each of the component color elements of two colors vary by no more than 10%, then the two colors are considered to be the same color for purposes of determining color frequencies (as will be discussed below.) Further still, in the instance where the colors of the captured content are represented in an RGB (red-green-blue) format, in this processing step the color format may be converted from RGB to an HSL (hue-saturation-lightness) format and compared for similarity using only the hue and saturation elements, ignoring the lightness element. In doing this, two colors that are the same or similar (within some threshold amount), except for their lightness element, may also be considered the same color. Advantageously, this comparison (without respect to the lightness element) allows for identifying the same color in the working image when shading and/or translucency may be present.

A second color-related processing pass may comprise making an assumption that most of an image is background data, which means that the highest occurring colors in the working image are background data and likely not some portion of an interesting feature of the captured image. In this processing pass, a threshold number of colors of the working image are identified as background data. In various embodiments, the colors that comprise background data are simply flagged as background data. Alternatively, those colors that are determined to be background data may be set to a designated background color (e.g., green or black). The threshold number of colors may be determined according to the percentage of colors of the working image, with a target percentage being established as background. For example, a target percentage may be to convert at least 60% of the image to background data, and the threshold number of colors corresponds to the top-most occurring colors that, collectively, meet or exceed that percentage.

A next processing step is to reduce the amount of foreground artifacts that do not possess sufficient "mass" (aggregate number of adjacent/contiguous foreground pixels). More particularly, foreground artifacts that do not possess the requisite mass are removed from the working image, or more accurately stated, identified as background data. As will be set forth in greater detail below, this processing step may be carried out multiple times to reduce these small foreground artifacts that, due to their size, are unlikely to be the interesting feature of the captured image. The remaining foreground artifacts are then deemed to be the likely "interesting" features of the working image.

With likely "interesting" features now identified in the working image as foreground content, with isolated (small) foreground artifacts converted to background data, an additional processing phase or step is to identify bounding boxes surrounding each of the one or more remaining foreground artifacts of the working image (and, correspondingly, of the captured image.) Based on various criteria including, by way of illustration and not limitation, the size, shape and position of a bounding box of a given feature, a selected interesting feature is identified and the bounding box of the selected interesting feature is mapped to the captured image. The sub-image of the captured image contained in the mapped bounding box is considered the selected interesting feature of the captured image.

As mentioned above, by processing a working image of the captured image according to the manner described above, one or more interesting features of a captured image may be advantageously processed on a variety of computing devices. This ability arises, at least in part, due to the reduction in the amount of data that must be processed, which also results in the simplification of the processing that must be accomplished. For example, for a captured image that has a pixel resolution of 1024×768 with 24-bit color, there are over 2.3 million bytes of data in the captured image, with over 780,000 pixels to be processed, where each pixel may be any one of over 16.7 million colors. Clearly, processing this amount of data to quickly identify interesting features presents a challenge to many user computers. On the other hand, by reducing the pixel resolution, for example, to one pixel out of every 10×10 pixel grid, the number of pixels becomes about 7800 pixels, a reduction of two orders of magnitude in the number of pixels! Reducing color resolution results in even larger reductions to the amount of data that needs to be processed, allowing user computing devices of all types to quickly identify interesting features. Moreover, utilizing the various processing steps of the disclosed subject matter enables accurate identification of interesting features in a captured image without appreciably affecting the accuracy of the identifications.

In addition to its ability to be processed on a wide variety of computing devices, implementation of the disclosed subject matter further and advantageously provides significant privacy to the computer user. Indeed, rather than sending a captured image (that may include personal information of the computer user) to a remotely located server for processing, the captured image is retained at the user's computing device and only the sub-image representing the interesting feature is supplied to the remotely located server in a request for related images. In short, by utilizing one or more of the various processing steps as outlined in this disclosure, content displayed to the user on the computing device can be captured, processed, an interesting feature can be identified, and the sub-image corresponding to that interesting feature can be extracted on the local computer, all without exposing the captured content to other computing devices over a network. The disclosed subject matter protects the privacy of the computer user, while providing results (e.g., getting similar images to interesting features displayed to the user) that typically require substantial, remote resources.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of definition, a "captured image" as well as a "working image" corresponds to a bitmapped image comprising rows and columns of pixels (picture elements). As will be appreciated by those skilled in the art, the pixel resolution or image resolution of the captured and/or working image refers to the amount of detail that the image holds, and more particularly in regard to the number of pixels in the image as determined by the number of rows and columns of pixels. Of course, as those skilled in the art will appreciate, each pixel in the captured and working image has, or is set to, a color.

By way of definition, the term "foreground pixel" refers to a pixel of the working image that is not designated as a background pixel or background data. In contrast, then, the term "background pixel" refers to a pixel in the working image that is considered to be background data. The term "artifact" refers to one or more foreground pixels in the working image. Each artifact (also referred to as a foreground artifact) is an aggregation of one or more contiguous foreground pixels.

Figure 1:
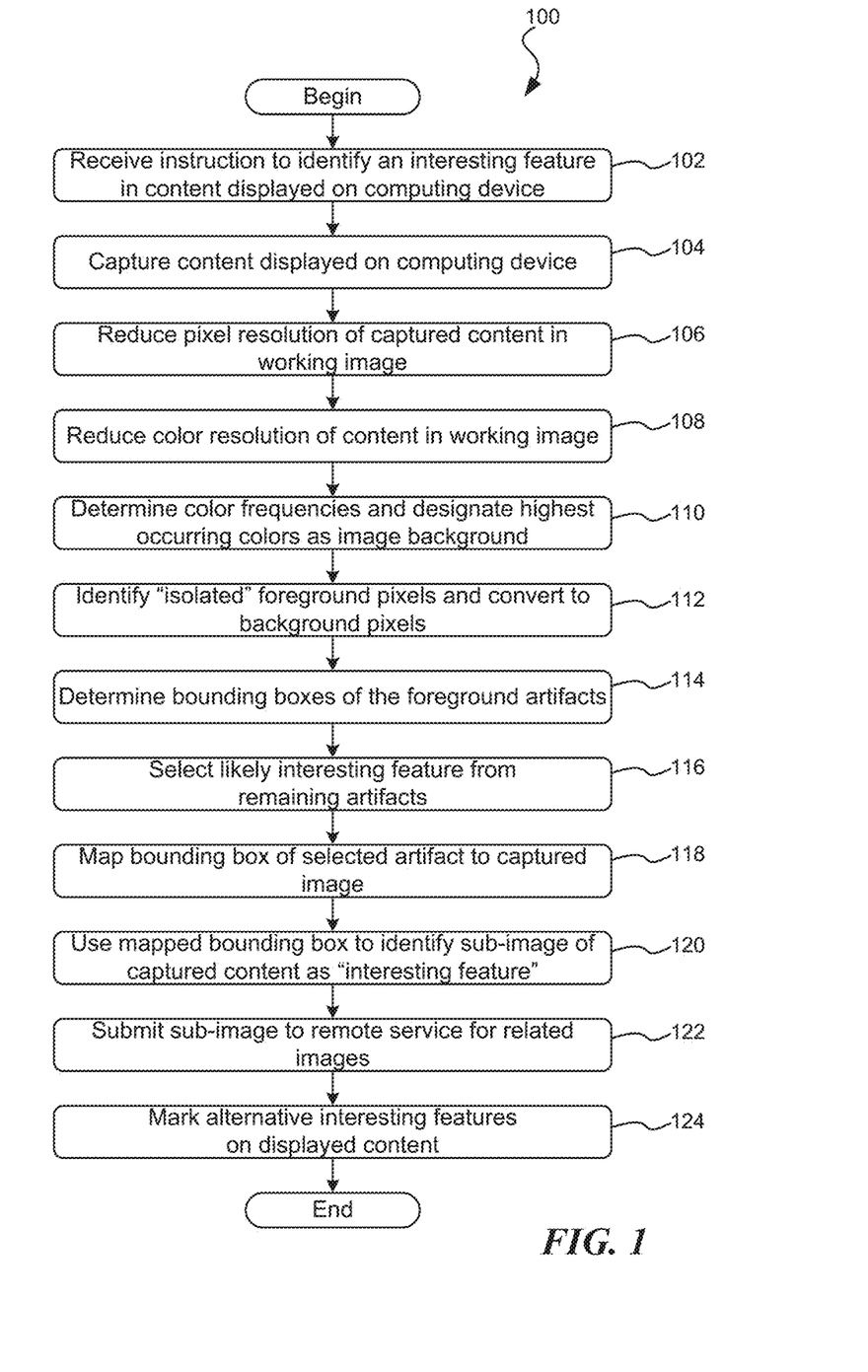
FIG. 1 is a flow diagram illustrating an exemplary, computer-executable routine suitable for identifying an interesting feature of content displayed on a computing device.
Figure 2:
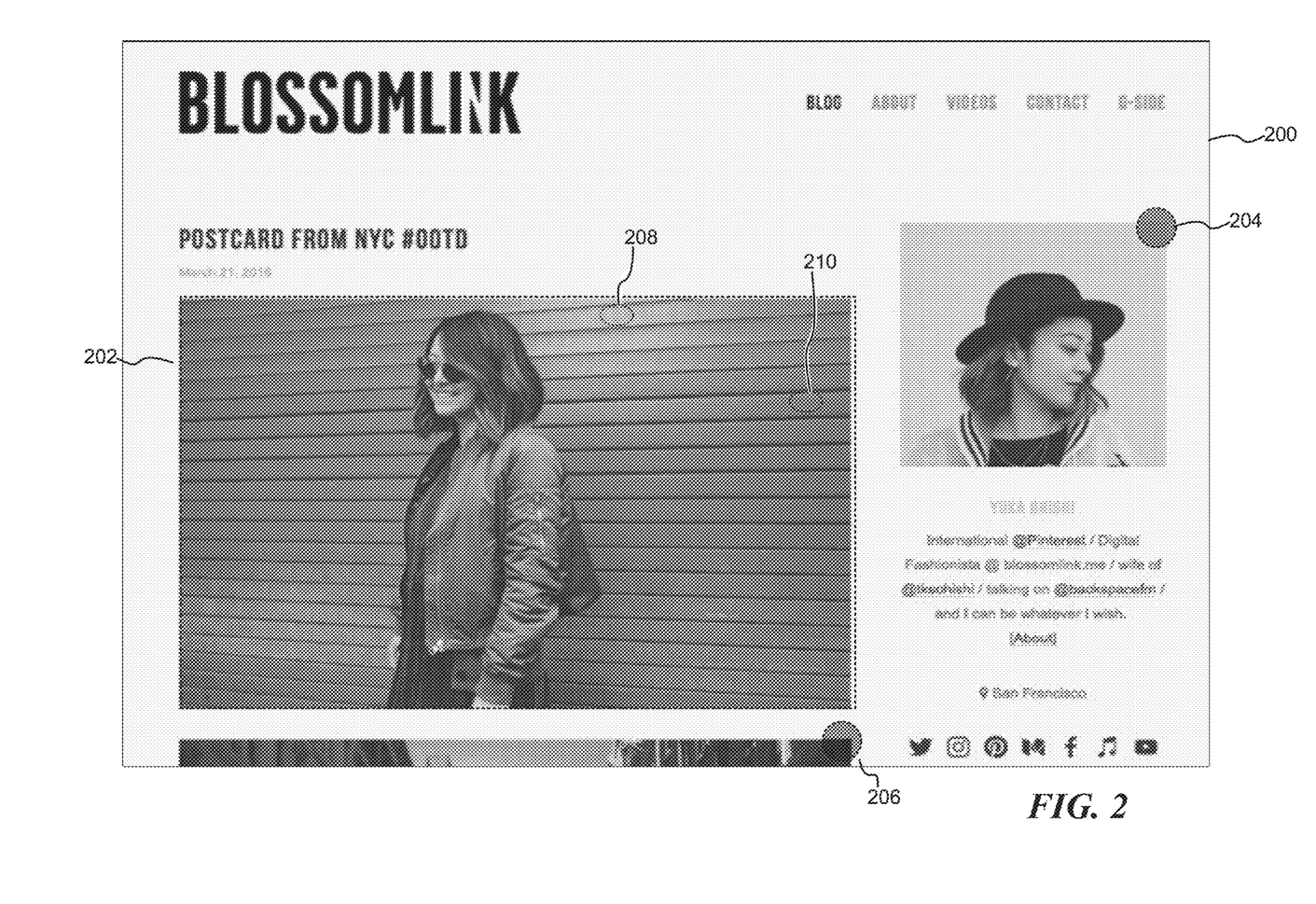
FIG. 2 is a pictorial diagram illustrating an exemplary image as may be displayed on a computing device, and suitable for further processing to identify features within the image, according to aspects of the disclosed subject matter.

Turning now to the figures, FIG. 1 is a flow diagram illustrating an exemplary, computer-executable routine 100 suitable for identifying an interesting feature of content displayed on a computing device. Beginning at block 102, an instruction to identify an interesting feature in the content displayed on the computing device is received. At block 104, in response to the received instruction, all or some of the content presented on the computing device is captured, resulting in a captured image. According to aspects of the disclosed subject matter, all content displayed on the computing device, irrespective of which application may be presenting the content, including any background imagery, may be captured in the instruction to capture displayed content. In an alternative embodiment, the content corresponding to the application that received the instruction may be captured. Irrespective of the scope of captured content, the result is a captured image among which an interesting feature (or features) is to be identified. By way of example and illustration, FIG. 2 is a pictorial diagram illustrating an exemplary captured image 200 as may be captured from content displayed on a computing device, as described in block 104.

Figure 3:
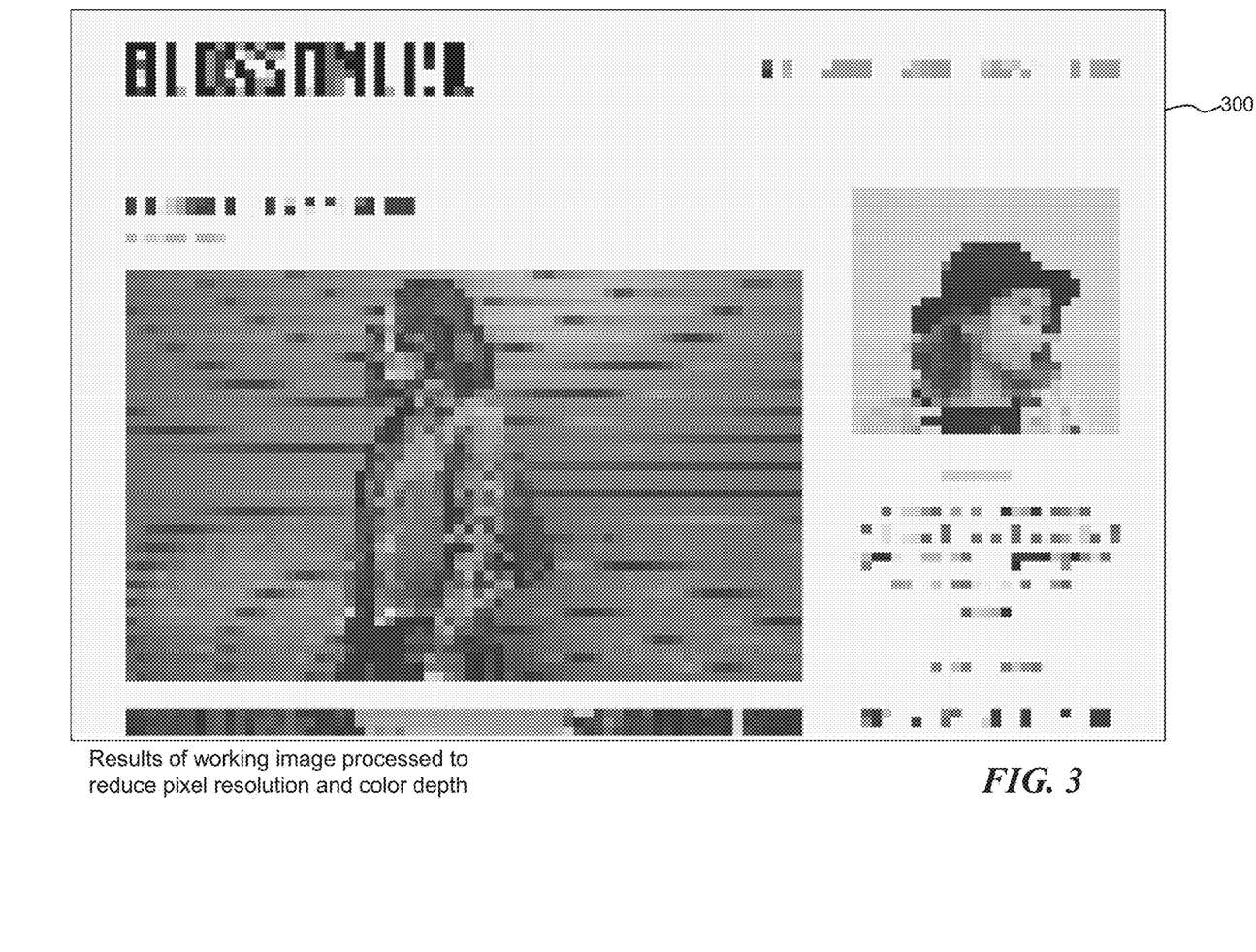
FIG. 3 is a pictorial diagram illustrating a working image corresponding to the exemplary image of FIG. 2 and processed to a reduced pixel resolution and a reduced color resolution, according to aspects of the disclosed subject matter.

As suggested above, many computing devices provide high display or pixel resolution (in terms of the number of pixels displayed, both in terms of actual display surface of the computing device as well as in regard to the number of pixels in a given area displayed by the computing device) on a display component of the computing device. Similarly, typical computing devices also provide high color depth or resolution, i.e., the number of different colors to which a given pixel may be set, often determined by the number of bits that are used to determine the color of the pixel. Indeed, a common color depth is 24-bit color. Of course, these features are highly desirable in most contexts, but due to high display resolution and high color depth, analyzing a captured image for interesting features, without reducing the amount of image data that must be processed, requires significant processing resources and may be beyond the capacity of many user computing devices. Further, even in those cases where a computing device is sufficiently capable of processing such large amounts of data, it is still advantageous to reduce the amount of data that needs to be processed. Moreover, it is advantageous, from at least a security/personal privacy position, to process the content locally, which may mean that the amount of data to be processed should be reduced. Accordingly, one or more processing steps that reduce the amount of image data that must be processed may be implemented. As part of this reduction, at block 106, a reduction to the pixel resolution of the image is carried out and the results are stored as a working image. Placing the results of this pixel reduction in a working image allows for the retention of the unmodified captured image for later use. In continuance of the example and illustration above, FIG. 3 is a pictorial diagram illustrating a working image 300, corresponding to the exemplary image 200 of FIG. 2, and processed to a reduced pixel resolution as discussed in regard to block 106, as well as a reduction to the color resolution as described below in regard to block 108.

According to aspects of the disclosed subject matter, a reduction to the pixel resolution may be carried out by any of a variety of processes. As one example, one pixel of a grid of pixels is saved to the working image as the representative pixel for the grid. In this regard, the captured image is logically segmented into grids of x rows and y columns. By way of illustration and not limitation, both x and y may correspond to 10 pixels, i.e., a 10×10 area of pixels within the captured image, where the (0,0) pixel within each grid is retained as the representative pixel for the grid. Alternatively, due to various limitations encountered in some processing environments, it is often necessary to reduce the pixel resolution such that the resulting image is less than about 5000 bytes of data, i.e., 64×64 bytes of data. Of course, other dimensions may be utilized so long as the maximum size is not exceeded.

As will become apparent below, it is important to know the particular formula (e.g., selecting representative pixels from 10×10 grids) of reducing pixel resolution. Indeed, knowing the particular reduction formula is needed in order to map a bounding box of a working image to a corresponding sub-image of the captured image 200.

After reducing the pixel resolution of the captured image (resulting in a working image), at block 108, a second reduction may be implemented in the form of a color resolution reduction. Indeed, in this processing pass, similar colors are merged or viewed as a single color. For example, two colors whose variation (in terms of the constituent values/elements that, collectively, represent the color) from one another that fall within some threshold amount may be viewed or treated as the same color. More particularly and by way of illustration, if the component color elements of two colors vary by no more than 10%, then the two colors may be considered to be the same color for purposes of determining color frequencies (as will be discussed below.) With regard to FIG. 2, the color that is found in circle 208 is somewhat different from the color found in circle 210. However, as they fall within a predetermined threshold of variance from each other, they are merged as the same pixel color.

Further still, in the instance where the colors of the captured content are represented in an RGB (red-green-blue) format, in this processing step the colors of the working image may be converted to an HSL (hue-saturation-lightness) format and compared for similarity using only the hue and saturation elements, while ignoring the lightness element. In doing this, two colors that are the same or similar (within some threshold amount), except for their lightness element, may also be considered the same color. Advantageously, this conversion also allows for color matching irrespective of whether there were translucent colors in the captured image. Further, this comparison (without respect to the lightness element) allows for identifying the same color in the working image when shading may be present.

After reducing the amount of data of the working image (whether by reducing pixel resolution, color resolution, or both), at block 110, the color frequencies of the working image 300 are determined, and a threshold number of the highest occurring colors are designated or flagged as background data. Designating the most frequently occurring colors as background data is based on the assumption that the interesting feature of the image stands out from most of the image, i.e., the background.

Figure 4:
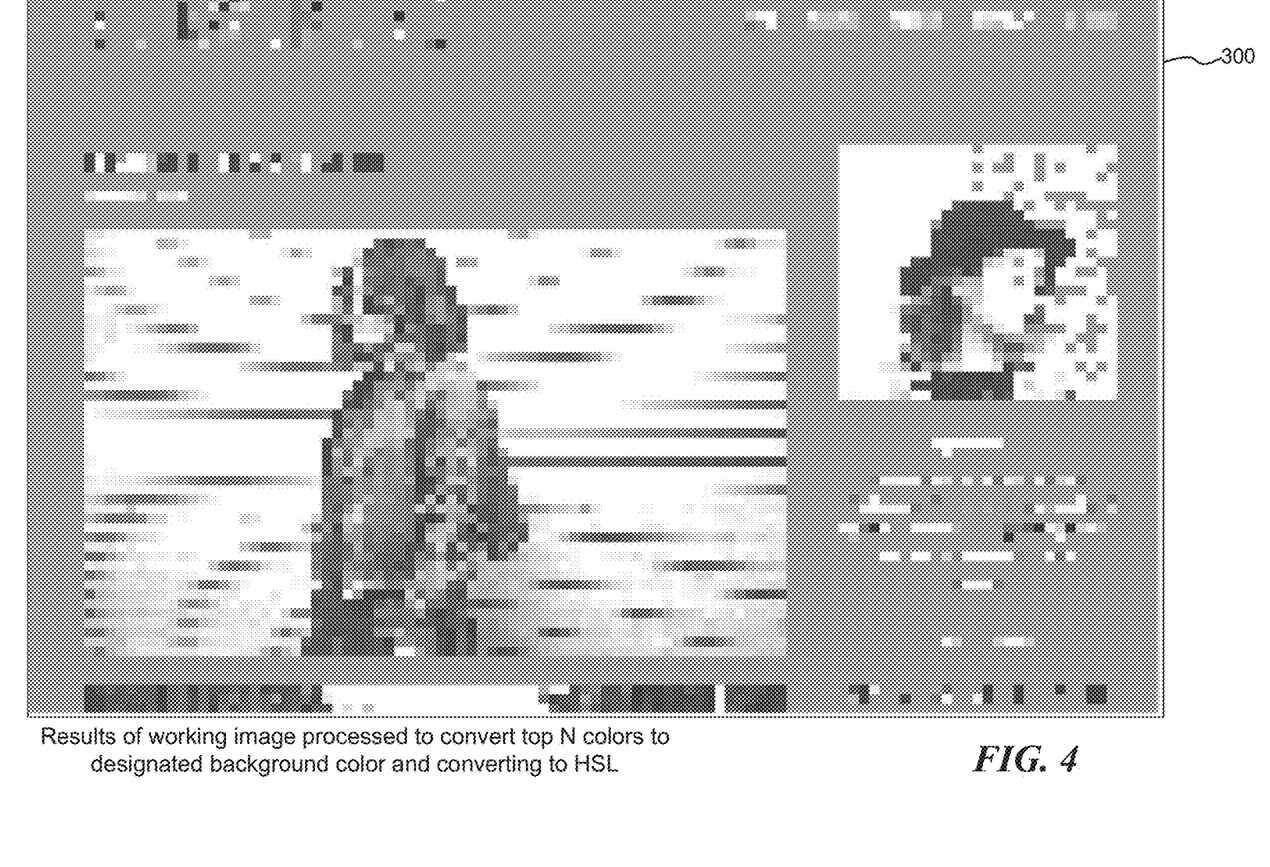
FIG. 4 is a pictorial diagram illustrating the working image of FIG. 3 further processed to convert top occurring colors within the working image to a designated background color, according to aspects of the disclosed subject matter.

Regarding the designation of the highest occurring colors to background data, in one embodiment a predetermined threshold number of the top-most occurring colors may be used. For example, after determining the color frequencies, each pixel of the working image having one of the top 3 occurring colors of the working image (with 3 being a predetermined threshold) is designated (or flagged) as background data. In some embodiments, rather than designating the top-most colors as background data, the pixels may be converted to a designated background color, such as vivid green or black. According to aspects of the disclosed subject matter, the number of colors designated as background data may be based on the total number of colors within the image. As yet another alternative embodiment, an analysis of the color frequencies of the working image may be conducted to determine a suitable number of colors to designate as background data. For example, and by way of illustration and not limitation, an analysis may be made to identify how many of the top-most occurring colors must be flagged as background data in order to have at least a threshold percentage, e.g., 70%, of the working image background data. In continuance of the example and illustration above, FIG. 4 is a pictorial diagram illustrating the exemplary working image 300 conceptually illustrating the top-most occurring colors converted to a designated background image, as discussed in regard to block 110.

At block 112, an additional processing step is conducted to identify and convert isolated foreground artifacts into background data. In one embodiment, the pixels of the working image are examined. For each pixel that is a foreground data (i.e., is not designated as background data or converted to a background color), an evaluation of adjacent or contiguous pixels is made. In one embodiment, any foreground pixel that has less than a threshold number of adjacent and/or contiguous foreground pixels is converted to a background pixel (i.e., designated as background data). In regard to adjacent, contiguous pixels, if a first foreground pixel is immediately adjacent to a second foreground pixel which, in turn, is immediately adjacent to a third foreground pixel, the three foreground pixels are considered contiguous irrespective of whether the first and third foreground pixels are adjacent. In one embodiment and by way of illustration and not limitation, the threshold number for identifying isolated foreground pixels is set at 3, i.e., a set of at least 3 other foreground pixels that are adjacent and/or contiguous to a first pixel.

Figure 5:
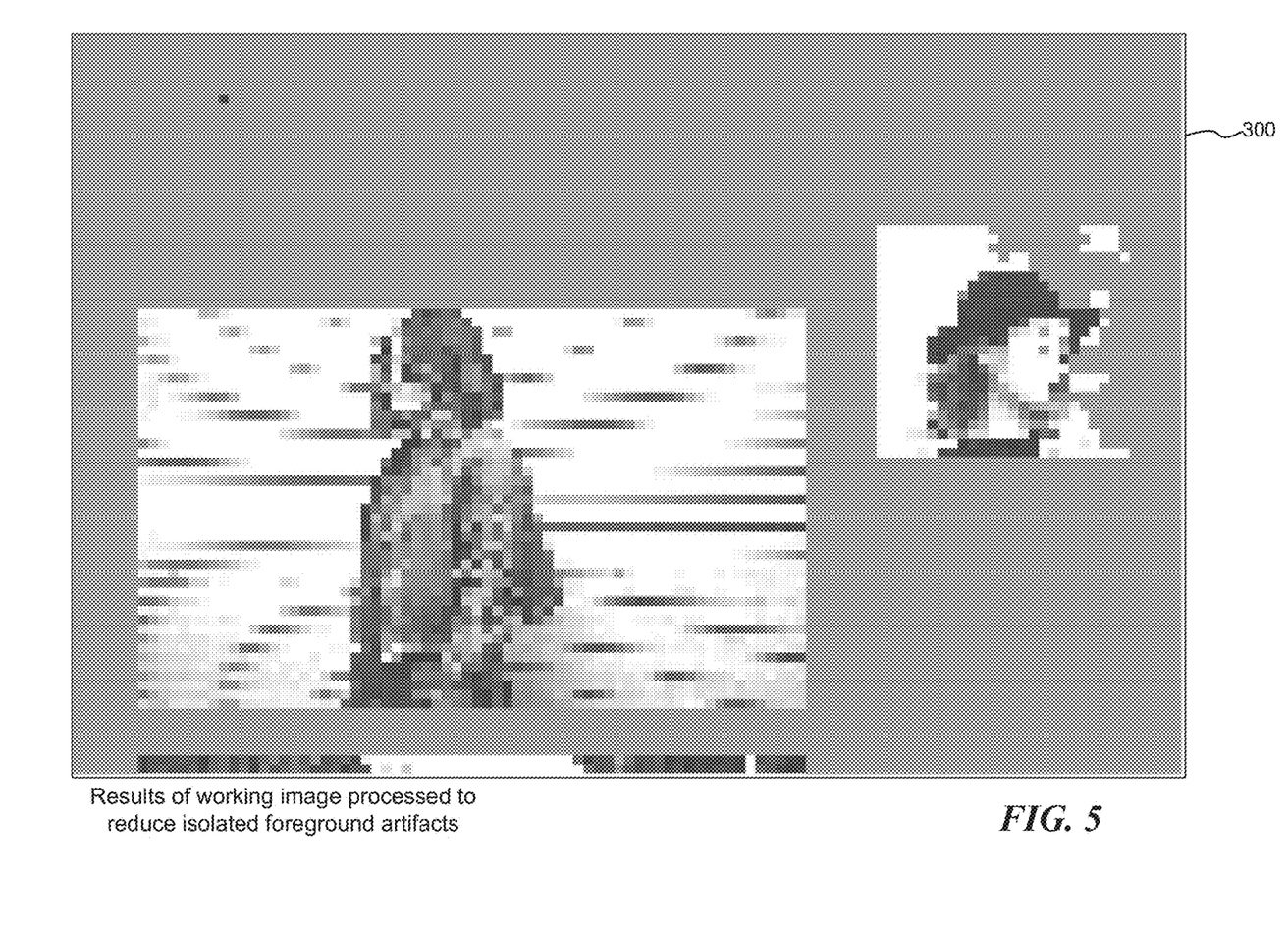
FIG. 5 is a pictorial diagram illustrating the working image of FIG. 4 further processed to eliminate isolated foreground artifacts/content, according to aspects of the disclosed subject matter.

In an alternative embodiment of reducing foreground artifacts, for each foreground pixel (i.e., is not designated as background data), an evaluation of immediately adjacent pixels is made, and any foreground pixel that has less than a threshold number of immediately adjacent foreground pixels is designated as a background pixel, without regard to contiguity or chaining of multiple pixels. In this embodiment, as some pixels of a contiguous chain of pixels (though not adjacent) may be converted to background data, it may be advantageous to execute this foreground artifact reduction multiple times, e.g., 3 times. In continuance of the example and illustration above, FIG. 5 is a pictorial diagram illustrating the exemplary working image 300 as may be processed to eliminate isolated foreground artifacts, converting isolated foreground artifacts to background data as discussed in regard to block 112.

Figure 6:
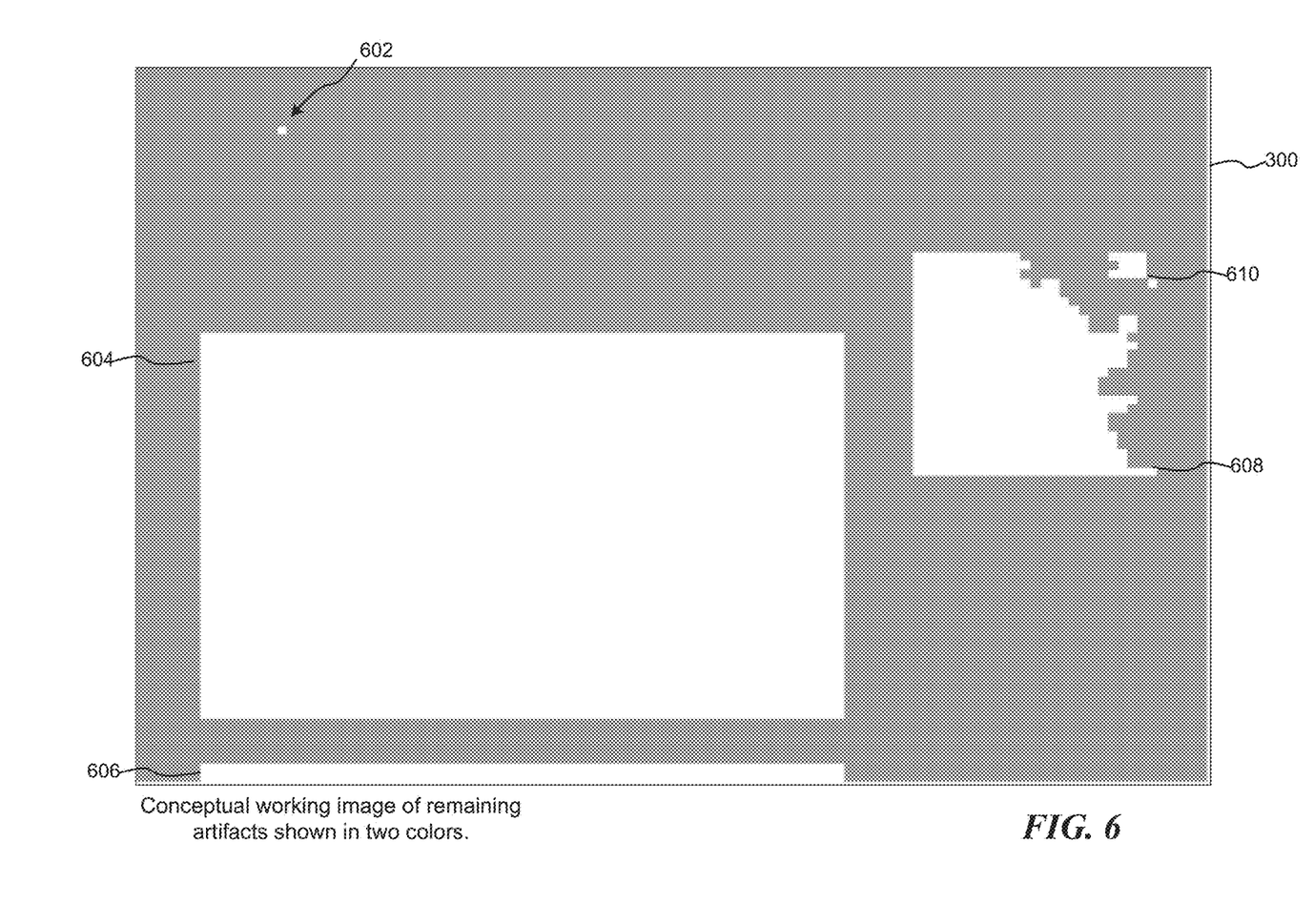
FIG. 6 is a pictorial diagram illustrating the working image of FIG. 5 illustrating the remaining foreground artifacts of FIG. 5 shown in binary-type data, according to aspects of the disclosed subject matter.

As will be appreciated, each pixel that is not designated as a background pixel is a foreground pixel, irrespective of the actual color of the foreground pixel in the working image. In this, the working image may be viewed as containing binary data: foreground or background pixels. FIG. 6 is a pictorial diagram illustrating the remaining foreground artifacts of FIG. 5 shown in binary-type data, i.e., just two colors, according to aspects of the disclosed subject matter. As can be seen in FIG. 6, at this point in processing the working image 300, there are five foreground artifacts or five distinct aggregations of one or more adjacent and/or contiguous foreground pixels in the working image 300 of FIG. 6, including artifacts 602-610.

Figure 7:
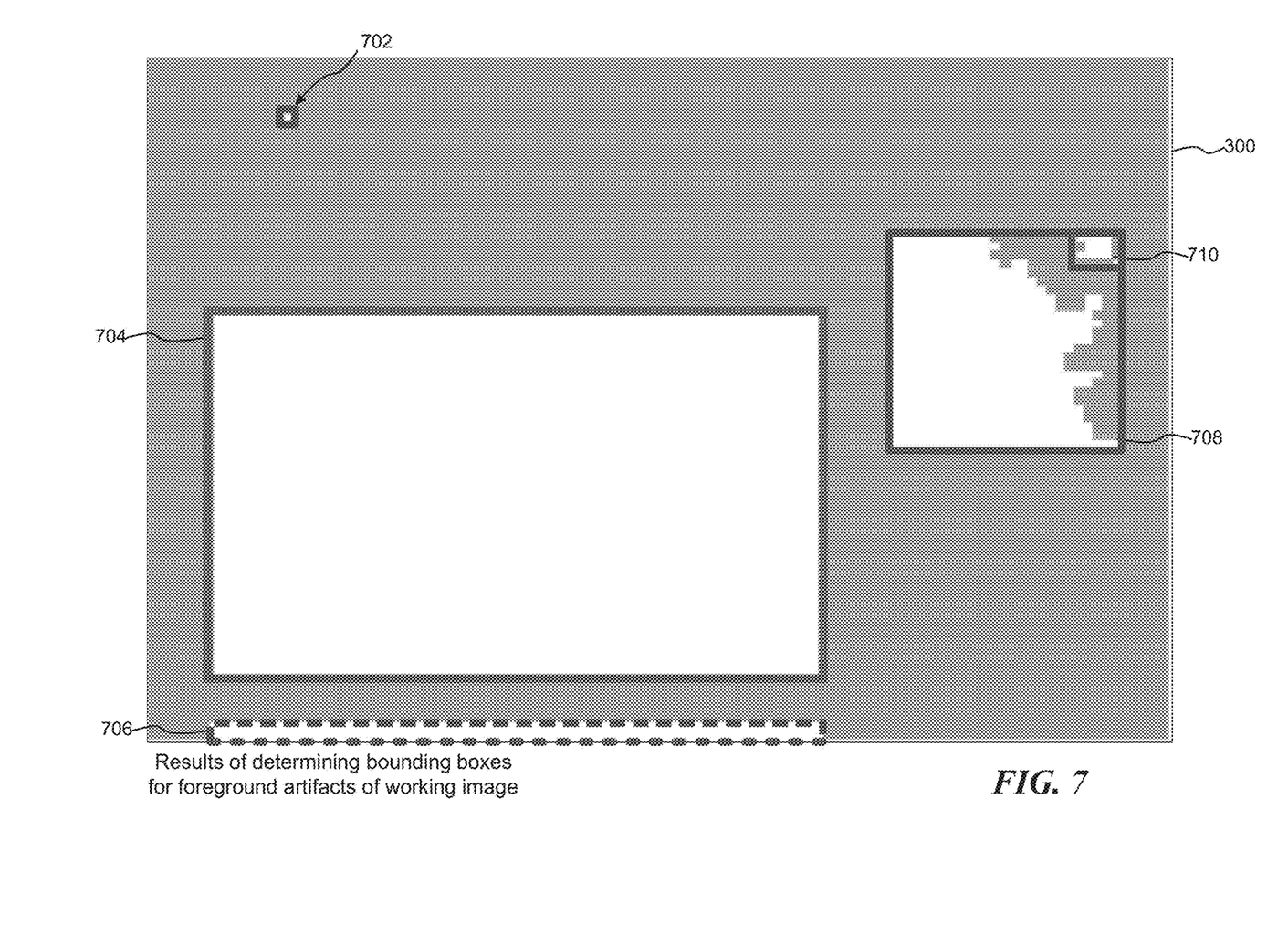
FIG. 7 is a pictorial diagram illustrating a bounding box of a selected foreground artifact of FIG. 6, according to aspects of the disclosed subject matter.

At block 114, bounding boxes are determined for each of the foreground artifacts in the working image 300. According to aspects of the disclosed subject matter, a bounding box defines a rectangular area of an image, having an origin (e.g., a top-left coordinate of the image), a width (e.g., a number of pixels extending to the right from the origin), and a height (e.g., a number of pixels extending down from the origin. In regard to the working image and particularly in regard to bounding boxes around foreground artifacts, each bounding box is determined such that its origin, height and width includes all pixels of the corresponding foreground artifact it is intended to encompass, but extends no further than needed to encompass the foreground artifact. In some instances, a bounding box may encompass other artifacts. In continuance of the example and illustration above, FIG. 7 is a pictorial diagram illustrating the exemplary working image 300 and further showing bounding boxes 702-710 encompassing the remaining foreground artifacts, as discussed in regard to block 114. As bounding box 710 is entirely encompassed within bounding box 708, according to one non-limiting embodiment, the smaller foreground artifact is considered to be part of the larger foreground artifact, at least for purposes of selecting an interesting feature as described in block 116 below.

With bounding boxes determined for each of the foreground artifacts, at block 116, a selection is made to identify which of the foreground artifacts should be identified as the interesting artifact. This selection may be made according to one or more selection criteria including, by way of illustration and not limitation, whether the area of the bounding box is larger than a threshold size amount of the working image (e.g., $\frac{1}{16}^{th}$ of the working image), whether the width of the bounding box is wider by more than a threshold width ratio of the height of the bounding box (e.g., whether the width of the bounding box is more than 3 times the height of the bounding box), whether the height of the bounding box is wider by more than a threshold height ratio of the width of the bounding box (e.g., whether the height of the bounding box is more than 3 times the width of the bounding box), the aspect ratio of the bounding box is portrait instead of landscape, whether the bounding box is closer to the top left corner of the working image than other bounding boxes, and the like. Additionally, scores may be associated with the various criteria as applied to each bounding box, and the bounding box with the highest score may be selected as the interesting feature. In furtherance of the example above, artifact 706 of FIG. 7 may be disqualified as a foreground artifact due to the relationship of its width to its height, being significantly wide and significantly small in height.

At block 118, after having identified the interesting feature (i.e., the selected bounding box), the selected bounding box is then mapped back to the captured image. As suggested above, information regarding the particular manner in reducing the pixel resolution is used to map the bounding box from the coordinates of the working image back to the captured image, with the mapped bounding box identifying the interesting feature in the captured image.

At block 120, the sub-image of the captured image is determined according to the mapped bounding box. At block 122, the interesting feature for which the user may be seeking a related image, the sub-image of the captured image, is then submitted to a remote service as a request for related images. In continuance of the example above, assuming that bounding box 704 is selected as the interesting feature from block 116, the corresponding sub-image/interesting feature of the captured image 200 is sub-image 202 of FIG. 2.

In addition to the various processing steps described above in regard to routine 100, other operations may also be made. For example, while an "interesting feature" is selected by the routine 100, it is possible that the various processing steps did not accurately identify the item in the captured image that caused the computer user to issue the instruction. On the other hand, in the case that there are multiple bounding boxes of the working image, it is possible that another bounding box (not the selected bounding box) represents the content that caught the computer user's attention. Accordingly, as an additional step 124, each of the bounding boxes of remaining foreground artifacts are mapped back to the coordinates of the captured image, along with the selected bounding box. Thereafter, user-actionable indicators, such as indicators 204 and 206 of FIG. 2, may be placed or presented with the captured image 200, with each indicator located in a non-selected bounding box. These indicators may be implemented as pop-up indicators that are displayed (pop up) as the user moves a cursor over the particular sub-image area. This provides the computer user with the ability to interact with an indicator such that the user can manually identify the interesting feature that was in the mind of the computer user and cause the sub-image of the newly selected feature (as determined by its bounding box) to be submitted to the remotely located service for related images. Thereafter, routine 100 terminates.

Regarding routine 100 described above, as well as other processes that may be described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

While any or all of the routines and/or processes described herein may be implemented on the user's computing device, on a remote service, or a combination of local and remote execution, advantageously the routines/processes are carried out locally on the user's computing device. As indicated above, the various processing steps significantly reduce the processing that is required to identify the interesting features without appreciably affecting accuracy. Moreover, local execution enables the user to have confidence that personal information is maintained locally, and that only the desired interesting feature (as a sub-image) is clipped and sent to a remote service.

Of course, while the routines and/or processes include various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 9 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 8:
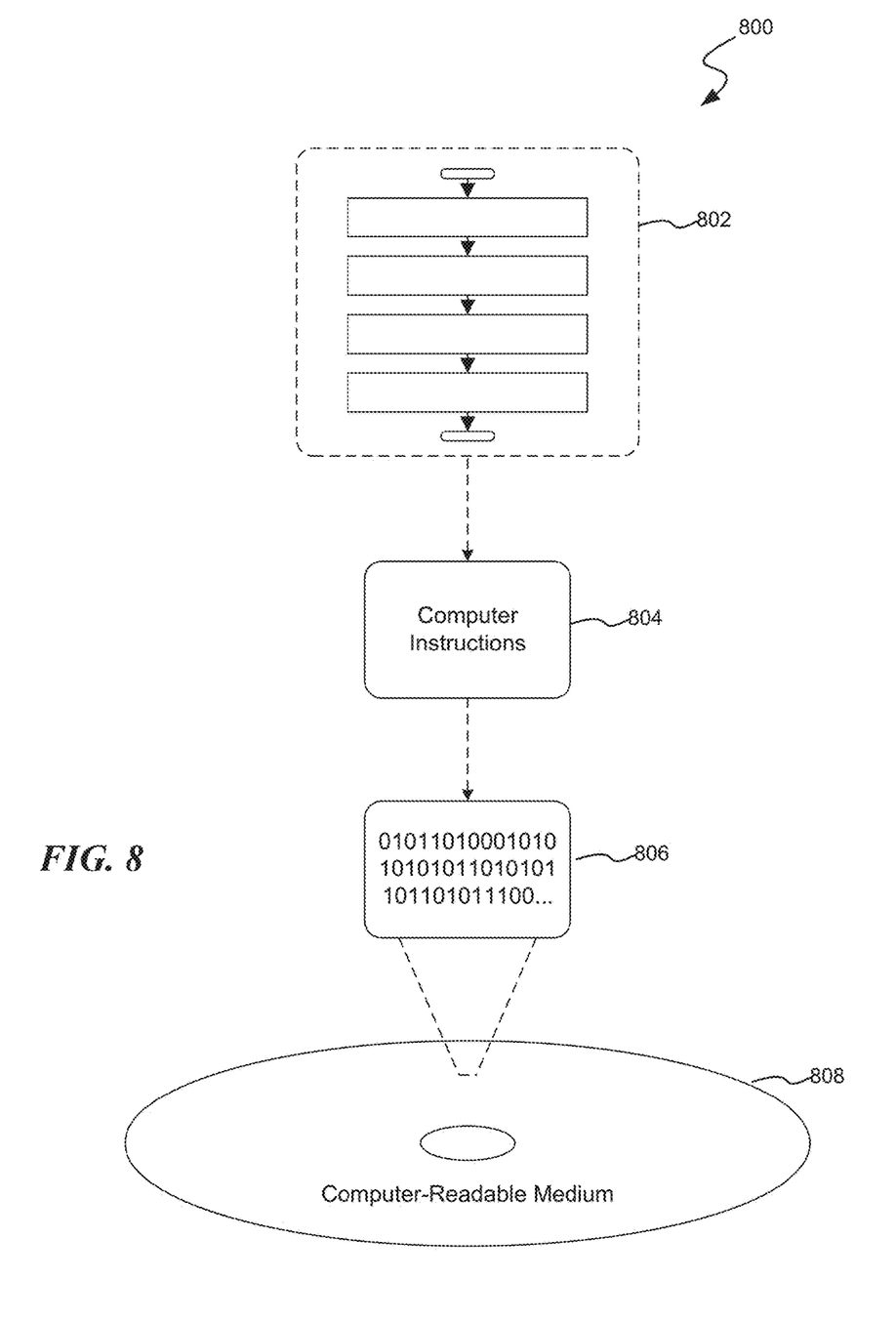
FIG. 8 is a block diagram illustrating an exemplary computer readable medium encoded with instructions for identifying one or more entities in an image.

Regarding computer readable media, FIG. 8 is a block diagram illustrating an exemplary computer readable medium encoded with instructions for detecting personal signals in monitored and/or captured content and data, as described in regard to FIG. 1. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of exemplary method 100, for example. In another such embodiment, the processor-executable instructions 804 may be configured to implement a system on a computing device, such as at least some of the exemplary, executable components of system 900 of FIG. 9, as described below. Many such computer readable media may be devised, by those of ordinary skill in the art, which are configured to operate in accordance with the techniques presented herein.

Figure 9:
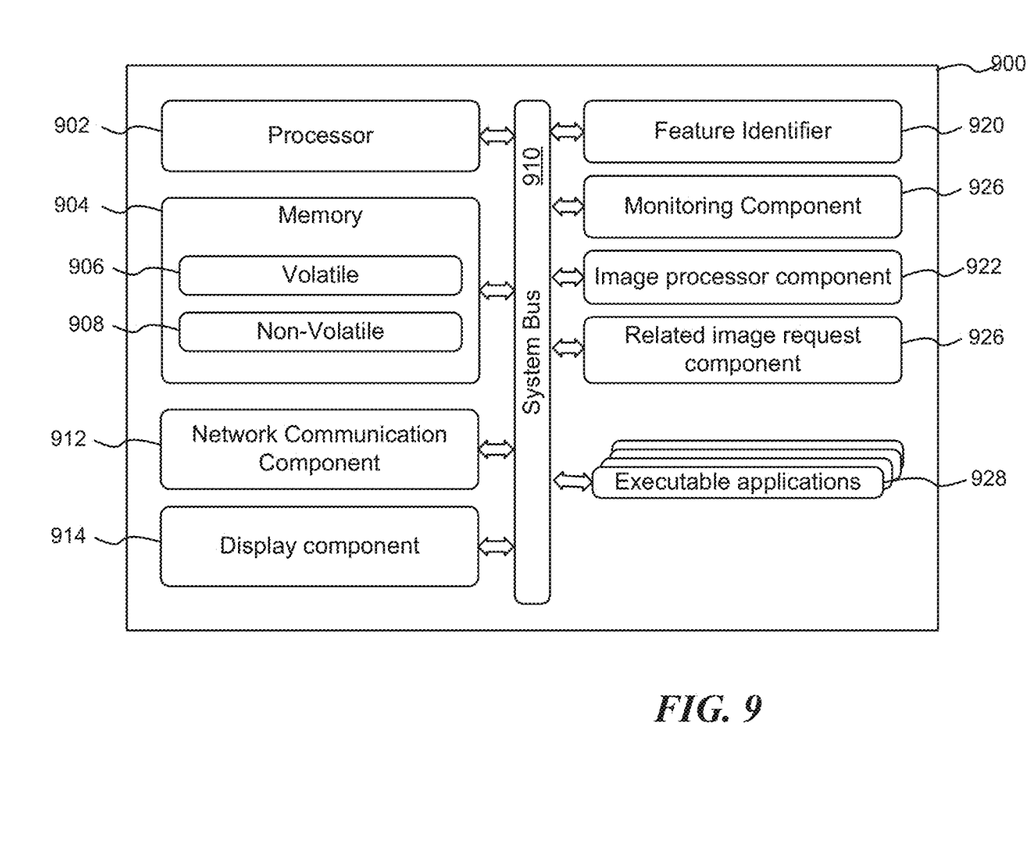
FIG. 9 is a block diagram illustrating an exemplary computing device suitable for implementing aspects of the disclosed subject matter.

Turning now to FIG. 9, FIG. 9 is a block diagram illustrating an exemplary personal computing device 900 suitable for identifying interesting content in a captured image in accordance with aspects of the disclosed subject matter. As suggested above, a suitably configured personal computing device may comprise any of a number of computing devices including, by way of illustration and not limitation, a desktop computer, a laptop/notebook computer, a tablet computer, computer game consoles and the like. Generally speaking, irrespective of the particular type of personal computing device, the personal computing device 900 typically includes one or more processors (or processing units), such as a processor 902, and further includes at least one memory 904. The processor 902 and memory 904, as well as other components of the computing device, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

As will also be appreciated by those skilled in the art, the processor 902 executes instructions retrieved from the memory 904, such as computer readable media 808 of FIG. 8, and/or other executable components in carrying out various functions of identifying interesting features of an image. The processor 902 may be comprised of any of a number of available processors such as single processor, multi-processor, single-core units, and multi-core units, which are well known in the art.

Further still, the illustrated computing device 900 typically also includes a network communication component 912 for interconnecting this computing device with other devices and/or services over a computer network, such as a remotely located service for identifying related images to a submitted image. The network communication component 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication component, such as network communication component 912, is typically comprised of hardware and/or firmware components (and may also include or comprise executable software components) that transmit and receive digital and/or analog signals over a transmission medium (i.e., the network.)

The illustrated personal computing device further includes a display component 914. Applications that are executed on the personal computing device 900, such as executable applications 928, render display content to a computer user via the display component (typically via one or more subsystems of the personal computing device). As will be appreciated, the display component is an output device that visually displays information to the computer user. The display component typically comprises the electrical components that convert electronic signals into visual presentations.

As suggested above, in regard to content that is displayed on the display component, the computer user may initiate some action corresponding to an instruction to identify an interesting feature displayed by the display component. This instruction is captured by an executable monitoring component 926. As the name suggests, the monitoring component, in execution, monitors for a computer user's instruction to identify a representative subsection of an image (captured from content displayed on the computing device) and notifies an executable feature identifier upon detecting the user instruction.

The instruction to identify an interesting feature is then directed to an executable feature identifier 920 for processing. In execution and upon receiving this instruction, the feature identifier 920 captures all or some of the content currently displayed by one or more applications (and/or other processes operating on the computing device) by the display component 914, the captured content being the captured image referred to above.

After obtaining the captured image, the feature identifier 920 provides the captured image to an executable image processor component 922. In execution on the personal computing device, the image processor component 922 processes the captured image to identify one or more features, corresponding to foreground artifacts, of the captured image. As discussed above, the image processing component generates a working image of the captured image and processes the working image according to the various processing steps outlined above in regard to routine 100 of FIG. 1. These processing steps include all or some of reducing pixel resolution of the captured imaged (the results being temporarily maintained in a working image), reducing color resolution of the image, designating one or more topmost occurring colors in the image as background pixels, converting isolated foreground artifacts to background data, and identifying bounding boxes for the various foreground artifacts.

The image processor component 922 further takes the various bounding boxes and, according to various rules for determining an interesting feature, selects one of the bounding boxes as the interesting feature of the captured image. The feature identifier 920 takes the selected bounding box, maps the bounding box to the captured image, and provides a sub-image of the captured image to an executable related image request component 926 to submit the sub-image as a request to a remotely located image server for related images.

Regarding the various components of the illustrated personal computing device 900, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, as implemented on a computer user's computing device, for identifying an interesting feature of an image, the method comprising:
    receiving an instruction from the computer user to capture an image of content presented on the computing device;
    capturing an image of content presented on the computing device according to the received instruction, wherein the captured image comprises a plurality of pixels at a pixel resolution;
    reducing the pixel resolution of the captured image and storing the results as a working image of the captured image;
    identifying a first set of colors of the working image, the first set of colors comprising one or more colors of the working image that occur most frequently in the working image;

for each pixel in the working image of a color identified in the first set of colors, converting the pixel to a background pixel, and wherein each pixel in the working image that is not a background pixel is a foreground pixel;
selecting a foreground artifact of the working image as an identified feature of the working image, the foreground artifact comprising one or more contiguous foreground pixels in the working image;
determining a bounding box of the selected foreground artifact;
mapping the bounding box of the selected foreground artifact to a sub-image of the captured image as the identified feature of the captured image; and
submitting the sub-image of the captured image as a request for related images of the identified feature.

2. The computer-implemented method of claim 1, wherein reducing the pixel resolution of the captured image comprises selecting a representative pixel of each grid of a plurality of grids of the captured image.

3. The computer-implemented method of claim 1, wherein reducing the pixel resolution of the captured image comprises reducing the pixel resolution to an image of no more than 4096 pixels.

4. The computer-implemented method of claim 1, wherein the captured image further comprises a color resolution; and
wherein the method further comprises reducing the color resolution of the working image.

5. The computer-implemented method of claim 4, wherein reducing the color resolution of the working image comprises merging pixels of at least two colors as a single color.

6. The computer-implemented method of claim 1, further comprising:
for each foreground pixel in the working image, if the foreground pixel is an isolated foreground pixel, converting the isolated foreground pixel to a background pixel;
wherein determining whether the foreground pixel is an isolated foreground pixel comprises determining whether the foreground pixel is one of a threshold number of adjacent, contiguous foreground pixels.

7. The computer-implemented method of claim 1, wherein selecting the foreground artifact in the working image as the identified feature of the working image comprises selecting the foreground artifact from a plurality of foreground artifacts according to any one or more of:
an area of a bounding box of a foreground artifact;
whether an area of a bounding box is larger than a threshold amount of the working image;
whether a width of a bounding box is wider by more than a threshold amount of a height of the bounding box;
whether a height of a bounding box is wider by more than a threshold amount of a width of the bounding box;
whether an aspect ratio of a foreground artifact has a portrait orientation; and
whether a foreground artifact is located nearer to a top left corner of the working image than another foreground artifact.

8. A computing device for identifying an interesting feature of an image, the computing device comprising a processor and a memory, wherein the processor executes instructions stored in the memory as part of or in conjunction with additional components, the additional components comprising:
an executable monitoring component that, in execution on the computing device, monitors for a computer user instruction to an interesting feature of an image and notifies an executable feature identifier component upon detecting the user instruction;
the executable feature identifier component that, in execution on the computing device and upon receiving notification from the monitoring component, captures an image of content presented on the computing device as a captured image comprising a plurality of pixels, and notifies an executable image processor component of the captured image; and
the executable image processor component that, in execution on the computing device and upon receiving notification of the captured image:
reduces a pixel resolution of the captured image and stores the reduced pixel resolution image as a working image;
identifies a first set of one or more colors of the working image, the first set of colors comprising colors of the working image that occur most frequently in the working image;
identifies each pixel of the working image having one of the first set of colors as a designated background pixel, wherein each pixel of the working image that is not a background pixel is a foreground pixel;
selects a foreground artifact of the working image from a plurality of foreground artifacts of the working image, the foreground artifact comprising a plurality of contiguous foreground pixels;
determines a bounding box of the selected foreground artifact;
maps the bounding box of the selected foreground artifact to a corresponding subsection of the captured image; and
provides the corresponding subsection of the captured image to the monitoring component as the interesting feature of the captured image.

9. The computing device of claim 8, wherein the captured image further comprises a color resolution; and
wherein the executable image processor component, in execution, further reduces the color resolution of the working image.

10. The computing device of claim 9, wherein reducing the color resolution of the working image comprises merging pixels of at least two colors as a single color.

11. The computing device of claim 8, wherein selecting the foreground artifact of the working image comprises selecting the foreground artifact from a plurality of foreground artifacts of the working image.

12. The computing device of claim 11, wherein selecting the foreground artifact of the working image further comprises selecting the foreground artifact according to whether an area of the bounding box is larger than a threshold amount of the area of the working image.

13. The computing device of claim 11, wherein selecting the foreground artifact of the working image further comprises selecting the foreground artifact according to an area of the bounding box.

14. The computing device of claim 11, wherein selecting the foreground artifact of the working image further comprises selecting the foreground artifact according to a location of the selected foreground artifact in the working image.

15. A computer-implemented method, as implemented on a computer user's computing device, for identifying a feature of a captured image comprising a plurality of pixels, the method comprising:

reducing a pixel resolution of the captured image and storing the results as a working image of the captured image;

reducing a color resolution of the working image;

determining frequencies of colors in the working image;

identifying a set of one or more colors in the working image, wherein the set of one or more colors includes the most frequent occurring colors in the working image;

converting each pixel of the working image having a color of the set of one or more colors to a background pixel, wherein each pixel of the working image that is not a background pixel is a foreground pixel;

selecting a foreground artifact of the working image, the foreground artifact comprising a plurality of contiguous foreground pixels;

determining a bounding box of the selected foreground artifact; and mapping the bounding box of the selected foreground artifact to a corresponding subsection of the captured image as the feature of the captured image.

16. The computer-implemented method of claim 15 further comprising, for each foreground pixel in the working image, if the foreground pixel is an isolated foreground pixel, converting the isolated foreground pixel to a background pixel.

17. The computer-implemented method of claim 16, wherein determining whether the foreground pixel is an isolated foreground pixel comprises determining whether the foreground pixel is one of a threshold number of adjacent, contiguous foreground pixels.

18. The computer-implemented method of claim 15, wherein reducing the pixel resolution of the captured image comprises selecting a representative pixel of each grid of a plurality of grids of the captured image.

19. The computer-implemented method of claim 15, wherein the captured image comprises a color resolution; and wherein reducing the color resolution of the working image comprises merginR pixels of at least two colors as a single color of the working image.

20. The computer-implemented method of claim 15, wherein identifying the set of one or more colors of the working image comprises selecting the most frequent occurring colors in the working image such that pixels of the working image having a color of the set of one or more colors represents at least a threshold percentage of pixels of the entire working image.

\* \* \* \* \*